(12) United States Patent
Masuda et al.

(10) Patent No.: US 10,036,088 B2
(45) Date of Patent: *Jul. 31, 2018

(54) SLIDING MEMBER AND METHOD OF MANUFACTURING THE SLIDING MEMBER

(71) Applicant: Senju Metal Industry Co., Ltd., Tokyo (JP)

(72) Inventors: Satoshi Masuda, Tochigi-ken (JP); Takashi Akagawa, Tochigi-ken (JP); Naoki Sato, Tochigi-ken (JP); Ryoichi Kurata, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 14/767,086

(22) PCT Filed: Feb. 15, 2013

(86) PCT No.: PCT/JP2013/053713
§ 371 (c)(1),
(2) Date: Aug. 11, 2015

(87) PCT Pub. No.: WO2014/125621
PCT Pub. Date: Aug. 21, 2014

(65) Prior Publication Data
US 2016/0010198 A1  Jan. 14, 2016

(51) Int. Cl.
*C23C 4/02* (2006.01)
*C23C 4/06* (2016.01)
(Continued)

(52) U.S. Cl.
CPC .............. *C23C 4/02* (2013.01); *B32B 15/01* (2013.01); *C23C 4/06* (2013.01); *C23C 4/08* (2013.01); *C23C 4/18* (2013.01)

(58) Field of Classification Search
CPC .... C23C 4/02; C23C 4/06; C23C 4/08; C23C 4/18; B32B 15/01; C24C 4/06
See application file for complete search history.

(56) References Cited

U.S. PATENT DOCUMENTS 5,592,840 A  1/1997  Miyasaka
5,958,522 A  9/1999  Nakagawa
(Continued)

FOREIGN PATENT DOCUMENTS

DE   102010053338 A1   6/2012
EP          1985856   * 10/2008 .............. F04B 27/10
(Continued)

OTHER PUBLICATIONS

Machine translaiton of JP 62-112769. May 1987.*
(Continued)

*Primary Examiner* — John E Uselding
(74) *Attorney, Agent, or Firm* — Chernoff, Vilhauer, McClung & Stenzel, LLP

(57) ABSTRACT

A sliding member which has joined strength that is suitable for the circumstance, to which heavy load is applied, and which is excellent in abrasion resistance property. The sliding member contains a supporting layer composed of ferrous metallic material, and a sliding layer composed of copper metallic material, which is formed on a surface of the supporting layer. The surface of the supporting layer and the sliding layer are configured not to be a plane and a sliding surface formed on a surface of the sliding layer is configured not to be a plane. The sliding layer is formed on the roughened surface of the supporting layer by thermal spraying.

1 Claim, 5 Drawing Sheets

(51) Int. Cl.
*C23C 4/18* (2006.01)
*B32B 15/01* (2006.01)
*C23C 4/08* (2016.01)

(56) References Cited

U.S. PATENT DOCUMENTS

| | | | |
|---|---|---|---|
| 6,294,029 | B1 | 9/2001 | Sakate et al. |
| 7,662,472 | B2 | 2/2010 | Tanaka |
| 9,303,230 | B2 | 4/2016 | Tomikawa et al. |
| 2003/0209103 | A1 | 11/2003 | Takayama |
| 2007/0009757 | A1 | 1/2007 | Takayama |
| 2009/0004030 | A1 | 1/2009 | Sugioka |
| 2009/0305917 | A1 | 12/2009 | Tanizawa et al. |
| 2009/0311476 | A1 | 12/2009 | Stetina |
| 2011/0044572 | A1 | 2/2011 | Kano |
| 2013/0216169 | A1 | 8/2013 | Zidar |
| 2015/0049966 | A1 | 2/2015 | Sato |

FOREIGN PATENT DOCUMENTS

| | | | | |
|---|---|---|---|---|
| EP | 2402606 | * | 1/2012 | ............ F04B 27/08 |
| JP | 62112769 | A | 5/1987 | |
| JP | H04232244 | A | 8/1992 | |
| JP | 07-190065 | A | 7/1995 | |
| JP | H07243307 | A | 9/1995 | |
| JP | WO/1995/025224 | | 9/1995 | |
| JP | H08209320 | A | 8/1996 | |
| JP | 1060617 | A | 3/1998 | |
| JP | 10-267033 | A | 10/1998 | |
| JP | 2000303161 | A | 10/2000 | |
| JP | 3425496 | B2 | 7/2003 | |
| JP | 2007284706 | A | 11/2007 | |
| JP | 2008274762 | A | 11/2008 | |
| JP | 5304974 | B1 | 10/2013 | |
| WO | 2013/039177 | A1 | 3/2013 | |
| WO | 2013/145108 | | 10/2013 | |

OTHER PUBLICATIONS

PCT, International Preliminary Report on Patentability (Chapter I or Chapter II) for International Application No. PCT/JP2013/053713, dated Aug. 20, 2015 (Aug. 20, 2015), pp. 5.
Japanese Patent Office, Notification of Rejection Reason(s), issued in Japanese Patent Application No. 2015-500060 dated Dec. 13, 2016, 13 pages.
Surface Technology Handbook, First Edition, published Feb. 27, 1998 by Surface Technology Association, pp. 839-841.
Metal Surface Treatment of JIS Handbook, First edition, published Apr. 24, 1998 by Japanese Standards Assocation, pp. 389-396.
Steel I of JIS Handbook, First edition, published Jan. 31, 2002 by Japanese Standards Association, pp. 1097-1098.
Influence of Blasting on Substrate Properties, by Toshifumi Kubohori et al. in High Temperature Journal, vol. 32, No. 6, published Nov. 2006 by High Temperature Society, pp. 313-320.
Search report from corresponding International patent application No. PCT/JP2013/053713, dated Mar. 12, 2013, 1 pg.
US Patent and Trademark Office, Office Action for U.S. Appl. No. 15/024,595, dated Jul. 15, 2016, 11 pages.
US Patent and Trademark Office, Final Office Action for U.S. Appl. No. 15/024,595, dated Dec. 16, 2016, 9 pages.
US Patent and Trademark Office, Office Action for U.S. Appl. No. 15/024,595, dated Nov. 30, 2017, 10 pages.
European Patent Office, Communication Pursuant to Article 94(3) EPC, dated Apr. 13, 2018, issued in European Patent Application No. 13875113, 6 pages.

* cited by examiner

SLIDING MEMBER AND METHOD OF MANUFACTURING THE SLIDING MEMBER

This is a national stage application filed under 35 USC 371 based on International Application No. PCT/2013/053713, filed Feb. 15, 2013.

TECHNICAL FIELD

The present invention relates to a sliding member that slidably supports a body to be slid and a method of manufacturing the sliding member.

BACKGROUND TECHNOLOGY

In past, a sliding member in which a sliding layer is formed on a metallic base has been often used. For example, in a sliding member used in a motor vehicle or construction machinery, it has been configured that a steel plate which has a high mechanical strength supports high load and a sliding layer which is made of lubricant copper-based alloy having a low mechanical strength smoothly slides a body to be slid. Regarding such a sliding member, a thermal spraying has been proposed as a method of forming a sliding layer on a surface of a supporting layer which is a steel plate. The thermal spraying means melting a metal that is different from a metallic base and has a desired characteristic by means of combustion gas, plasma, arc or the like, and attaching the melted metal onto a surface of the metallic base by spraying and applying it to the surface thereof through a nozzle together with compressed air.

According to this thermal spraying, because a metal is attached to the supporting layer by the thermal spraying, even when the supporting layer is a plane or an optional non-plane such as a spherical surface, it is possible to form a sliding layer having a sliding surface along a shape of a surface of the supporting layer (see, for example, the patent document 1).

DOCUMENTS FOR PRIOR ART

Patent Document

Patent Document 1: Japanese Patent No. 3425496

SUMMARY OF THE INVENTION

Problems to be Solved by the Invention

The thermal spraying disclosed in the patent document 1 performs cleaning processing to force any stain attached to a metal surface to be released and removed, based on such a concept that in order to obtain a strong joining strength by allowing metallic joining of a first metal attached by thermal spraying to a metallic base, which is matrix, the surface of the metallic base has to be as clean as possible because when an oxide, oil or the like stains a surface of the metallic base, the stain lies between the metallic base and the first metal to prevent any solid state diffusion between both metals so that it is impossible to perform their metallic joining, even if the first metal is attached to the stained surface of the metallic base and then heat treatment is performed under active atmosphere. It is said that polishing by sand blasting, any wire brush or the like is suitable for cleaning processing on the metallic base. The sliding member, however, containing a supporting layer and the sliding layer which are joined by the thermal spraying, requires the further joining strength between the supporting layer and the sliding layer when it is used in an oil hydraulic pump or the like to which heavier load is applied.

The present invention has an object to provide a sliding member having joined strength that is suitable for a circumstance to which heavy load is applied and a method of manufacturing the sliding member.

Means for Solving the Problems

The inventors have found out that by roughening one surface of a supporting layer, at which the supporting layer and the sliding layer are joined, the sliding layer can be formed on the one surface of the supporting layer by thermal spraying based on an anchor effect of the roughened surface.

The invention relates to a sliding member containing a supporting layer composed of first metallic material, and a sliding layer composed of second metallic material having composition that is different from that of the first metallic material, the sliding layer being formed by thermal spraying on one surface of the supporting layer which is roughened by impact processing such that powder having a corner part with an acute angle collides with the one surface thereof, the sliding layer is densified by impact processing such that spherical powder collides with a surface of the sliding layer and the surface of the densified sliding layer is polished.

It is preferable that the first metallic material of the supporting layer is composed of ferrous material and the second metallic material of the sliding layer is composed of copper material. Further, it is preferable that surface roughness Ra of the roughened one surface of the supporting layer is 2 μm or more.

Moreover, the invention relates to a method of manufacturing a sliding member containing a step of roughening roughing one surface of a supporting layer which is composed of first metallic material by impact processing such that powder having a corner part with an acute angle collides with the one surface thereof, a step of applying the second metallic material to the roughened one surface of the supporting layer by thermal spraying and sintering it to form a sliding layer along one surface of the supporting layer, a step of densifying the sliding layer following the forming step of the sliding layer by impact processing such that spherical powder collides with a surface of the sliding layer, and a step of polishing the surface of the densified sliding layer.

Effects of the Invention

According to this invention, by roughening one surface of a supporting layer, at which the supporting layer and the sliding layer are joined, the metallic material is applied to the one surface of the sliding layer by thermal spraying based on an anchor effect of the roughened surface and the metallic material applied by the thermal spraying is sintered so that it is possible to improve joined strength of the supporting layer and the sliding layer. Accordingly, it is possible to form not only a plane sliding member but also a non-plane sliding member.

Accordingly, it is possible to form not only the plane sliding member but also non-plane sliding member, which has a two-layer structure of the supporting layer principally having a load-receiving function and the sliding layer principally having slidability improving function.

EMBODIMENT FOR CARRYING OUT THE INVENTION

The following will describe embodiments of a sliding member and a method of manufacturing the sliding member according to the invention with reference to the drawings.

Configuration Example of Sliding Member According to this Embodiment

Figure 1:
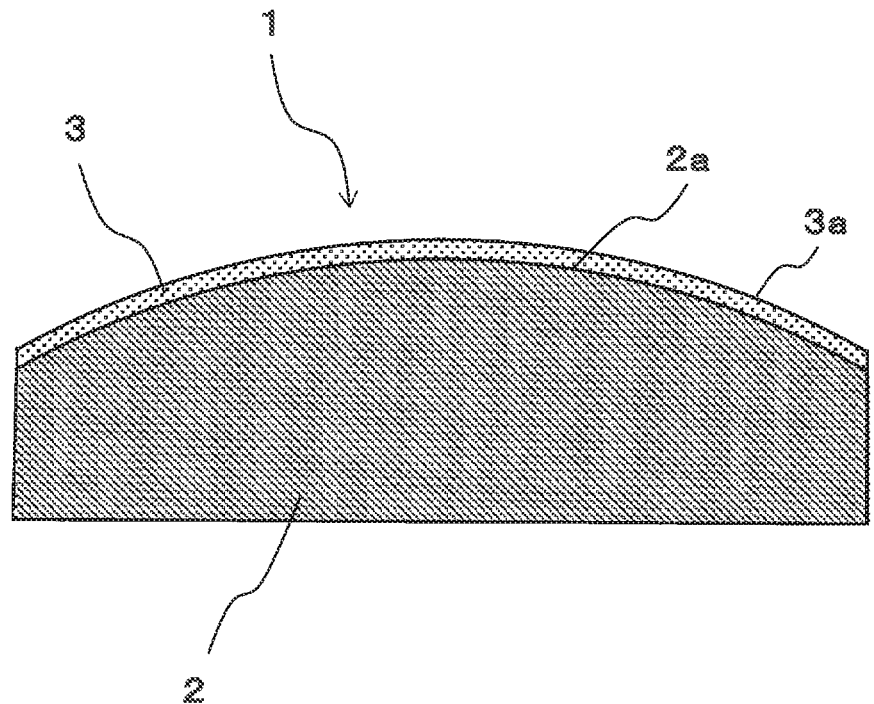
FIG. 1 is a sectional plan view of an example of a sliding member according to this embodiment.

FIG. 1 is a sectional plan view of an example of a sliding member according to this embodiment. FIGS. 2A through 2E are diagrams showing an example of a method of manufacturing the sliding member according to the embodiment.

The sliding member 1 according to this embodiment is provided with a supporting layer 2 composed of first metallic material, and a sliding layer 3 composed of second metallic material that is different from the first metallic material, in order to improve any slidability. A sliding surface 3a formed on one surface of the supporting layer 3 is configured to be, for example, a convex spherical surface, not plane, in a case of this embodiment, The supporting layer 2 is composed of iron (Fe) or an alloy in which iron is a main component and additives are added thereto. In the supporting layer 2, a surface 2a that is one surface thereof is configured to be convex spherical surface because the sliding surface 3a of the supporting layer 3 is configured to be, in this embodiment, a convex spherical surface.

In the sliding member 1, the surface 2a of the supporting layer 2 is roughened in order to improve joining strength of the supporting layer 2 and the sliding layer 3. In the sliding member 1, the surface 2a of the supporting layer 2 is roughened by performing, for example, a first blasting, which is a first impact processing, for forcing metallic powder having desired particle size and shape to collide with the surface 2a of the supporting layer 2 as surface-roughening processing for roughening the surface 2a of the supporting layer 2.

The sliding layer 3 is composed of copper (Cu), as second metallic material having a predetermined composition in order to improve any slidability, or an alloy in which copper (Cu) is a main component and additive is added thereto. The sliding layer 3 is formed by attaching copper or copper-based alloy by thermal spraying on the surface 2a of the supporting layer 2 which shows an anchor effect by roughening and sintering the copper or copper-based alloy attached by thermal spraying and the supporting layer 2.

Accordingly, in the sliding member 1, the sliding layer 3 having a predetermined thickness is formed on the surface 2a of the supporting layer 2 along a shape of the surface 2a of the supporting layer 2 and the sliding surface 3a composed of a convex spherical surface is formed on a surface of the sliding layer 3.

In the sliding layer 1, the sliding layer 3 is also densified in order to improve abrasion resistance property. In the sliding member 1, the sliding layer 3 is densified by performing, for example, a second blasting, which is a second impact processing, for forcing metallic powder having desired particle size and shape which are different from those of the surface-roughening processing to collide with the sliding surface 3a of the sliding layer 3 as densifying processing for densifying the sliding layer 3.

If the sliding layer is composed of iron or iron-based alloy in the sliding member, any seizing occurs in a case where a body to be slid which contacts the sliding member is iron or the like, so that its slidability is wrong. Accordingly, in the sliding member 1, it is possible to improve any slidability to provide the sliding layer 3 composed of copper or copper-based alloy on the surface 2a of the supporting layer 2 composed of iron or iron-based alloy.

The sliding layer 3 is configured to attach copper or copper-based alloy by thermal spraying to the surface 2a of the supporting layer 2 and sinter the supporting layer 2 and the sliding layer 3. Thus, it is possible to form the sliding layer 3 with a desired thickness on the surface 2a of the supporting layer 2 which is configured to have not any plane shape such as convex spherical surface. Thereafter, a polishing step is performed in order to aligning the design dimensions thereof. A plating step called "overlay" may be added after the polishing step.

When forming the sliding layer 3 by thermal spraying, there is a possibility where the joining strength is insufficient based on a condition of the surface 2a of the supporting layer 2. Therefore, by forming the sliding layer 3 by thermal-spraying copper or copper-based alloy onto the surface 2a of the supporting layer 2, which has been roughened by the first blasting, it is possible to maintain joining strength, which is required as the sliding member 1, between the supporting layer 2 and the sliding layer 3.

Further, in the sliding member 1, hardness of the sliding layer 3 is improved by densifying the sliding layer 3 by the second blasting so that the sliding layer 3 having desired hardness that is required under a circumstance in which a heavy load is applied can be formed. Additionally, in the sliding member 1, the sliding layer 3 is formed to have a desired thickness by densifying the sliding layer 3 using the second blasting. Still further, the sliding member 1 improves its hardness by densifying the sliding layer 3 using the second blasting so that it is possible to improve the joining strength by roughening the surface 2a of the supporting layer 2 and further improve the joining strength between the supporting layer 2 and the sliding layer 3.

Example of Method of Manufacturing the Sliding Member According to this Embodiment The following will describe a method of manufacturing the sliding member according to this embodiment.

Figure 2A:
FIG. 2A is a diagram showing an example of a step of manufacturing the sliding member according to the embodiment.
Figure 2B:
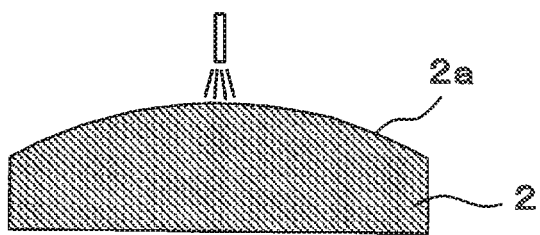
FIG. 2B is a diagram showing an example of a step of manufacturing the sliding member according to the embodiment.

The supporting layer 2 is composed of iron or iron-based alloy and as shown in FIG. 2A, the surface 2a of the supporting layer 2 is molded to meet a shape of the sliding member 1 as a finished member. The supporting layer 2 is formed to have a disk-like appearance in this embodiment so that the surface 2a of the supporting layer 2 is a convex spherical surface having a predetermined radius.

In the supporting layer 2, the surface 2a of the supporting layer 2 is roughened by performing the first blasting, as shown in FIG. 2, for forcing metallic powder having predetermined particle size and shape to collide with the surface 2a of the supporting layer 2 as the surface-roughening processing for roughening the surface 2a.

Figure 3A:
FIG. 3A is a graph showing an example of steel grit which is metallic powder to be used in a blasting.
Figure 3B:
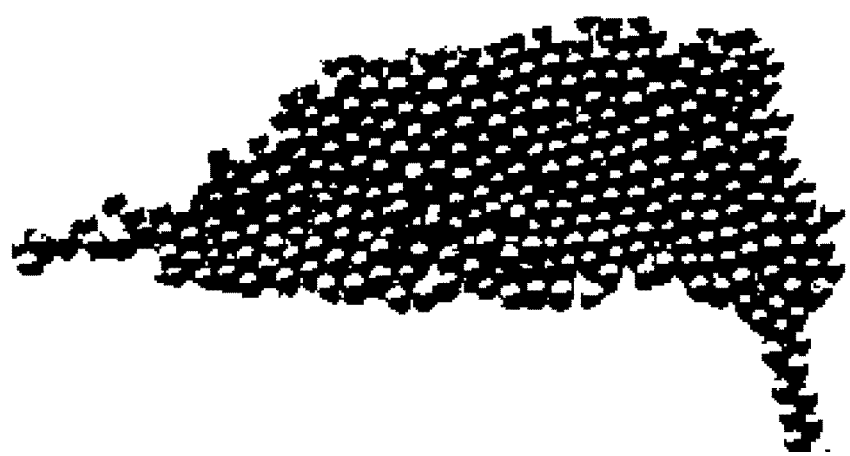
FIG. 3B is a graph showing an example of steel shot which is metallic powder to be used in a blasting.

FIGS. 3A and 3B are photographs showing an example of metallic powder to be used in the blasting. FIG. 3A shows metallic powder called "steel grit" and FIG. 3B shows metallic powder called "steel shot". The first blasting is performed in this embodiment by spraying ferrous powder called "steel grit" (see FIG. 3A) having a particle size of 425 through 1180 μm and hardness of Hv400 through Hv500 having a corner part with an acute angle onto the surface 2a of the supporting layer 2 by, for example, 0.2 through 0.7 MPa. This first blasting enables the surface roughness Ra (arithmetic average roughness stipulated as JIS B0601-1994) of the surface 2a of the supporting layer 2 to be 2 μm or more. When it is 2 μm or less, an anchor effect is not obtained and as a result after the thermal spraying, any partial or whole peeling occurs so that any sliding layer 3 is not formed.

Figure 2C:
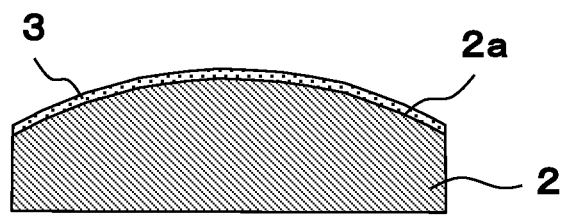
FIG. 2C is a diagram showing an example of a step of manufacturing the sliding member according to the embodiment.

Next, as shown in FIG. 2C, copper powder or copper-based alloy powder is attached to the roughened surface 2a of the supporting layer 2 by thermal spraying and then, the copper powder or copper-based alloy powder attached to the surface 2a of the supporting layer 2 by the thermal spraying and the supporting layer 2 are sintered. In this embodiment, it is performed by melting copper powder having particle size of 45 μm or less and spraying it onto the roughened surface 2a of the supporting layer 2.

Figure 2D:
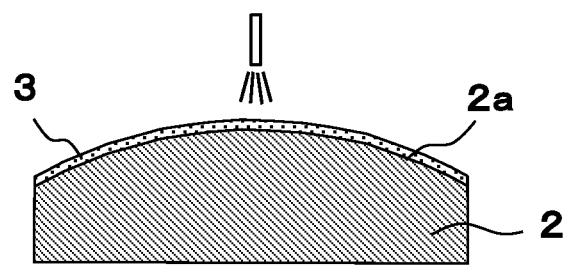
FIG. 2D is a diagram showing an example of a step of manufacturing the sliding member according to the embodiment.

Next, as shown in FIG. 2D, the second blasting is performed by forcing the metallic powder having predetermined particle size and shape to collide with the sliding surface 3a of the sliding layer 3 as densifying processing for densifying the sliding layer 3. The second blasting is performed in this embodiment by spraying ferrous powder called "steel shot" (see FIG. 3B) having a particle size of 1000 through 1700 μm and hardness of Hv400 through Hv500 onto the sliding surface 3a of the sliding layer 3 by, for example, 0.2 through 0.7 MPa.

Figure 4A:
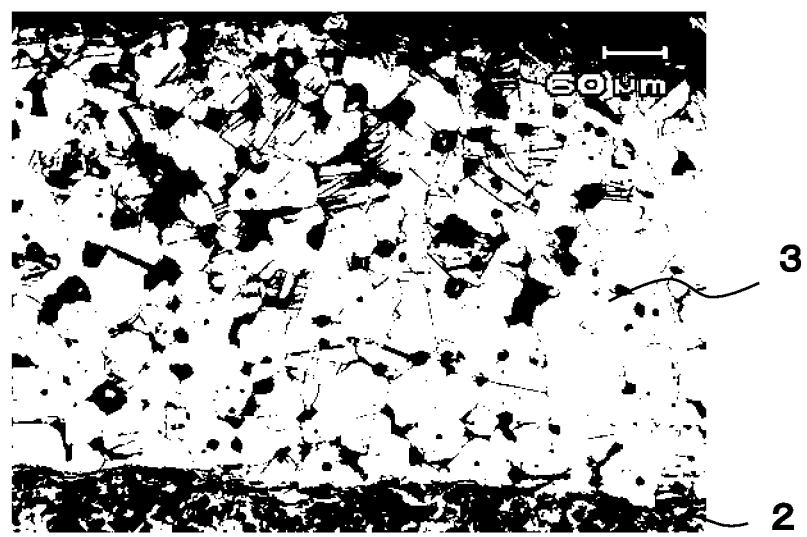
FIG. 4A is a micrograph of the sliding member according to the embodiment.
Figure 4B:
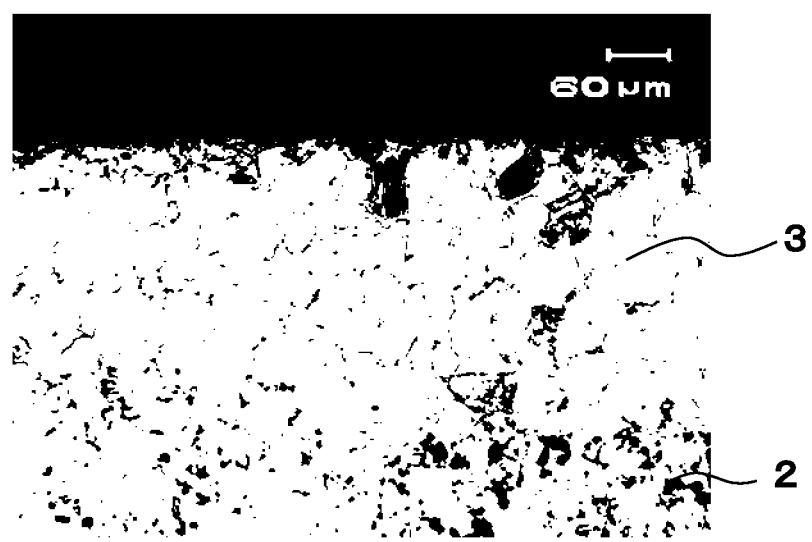
FIG. 4B is a micrograph of the sliding member according to this embodiment.

By the second blasting, any pressure such that voids in the sliding layer 3 are crumpled is applied and the voids decrease so that the sliding layer 3 is densified. FIGS. 4A and 4B are micrographs of the sliding member according to this embodiment. FIG. 4A shows a condition thereof after the sintering and before the second blasting and FIG. 4B shows a condition thereof after the second blasting.

As shown in FIGS. 4A and 4B, it is seen that the voids after the second blasting decrease as compared with a case before the second blasting. In this embodiment, although the hardness of the skidding surface 3a of the sliding layer 3 was of about Hv30 after the sintering and before the second blasting, it was increased up to about Hv130 through Hv140 after the second blasting.

Figure 2E:
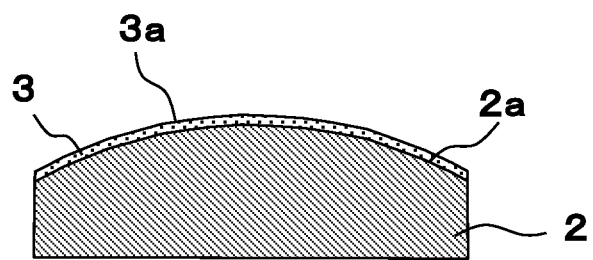
FIG. 2E is a diagram showing an example of a step of manufacturing the sliding member according to the embodiment.

Thereby, in the sliding member 1, as shown in FIG. 2E, the sliding layer 3 with a desired thickness is formed on the surface 2a of the supporting layer 2 along a shape of the surface 2a of the supporting layer 2 and the sliding surface 3a which has a predetermined hardness and is composed of the convex spherical surface is formed on a surface of the sliding layer 3.

Further, although a case where the sliding surface 3a in the disk like sliding member 1 has a shape of convex spherical surface has been described in the sliding member 1 of this embodiment as the shape of the sliding surface 3a which is not a plane, the sliding surface may have a shape of concave spherical surface or plane surface. Additionally, the sliding member 1 is not limited to a round but it may be, for example, a square shape in which the sliding surface may be formed to be convexly or concavely curved.

Although the first blasting has been illustrated as the first impact processing, the metallic powder is not limited to ferrous powder because the first impact processing has an object of roughening the surface 2a of the supporting layer 2 and obtaining the anchor effect at the time of thermal spraying. For example, glass beads, cut wire, silica sand, alumina, zirconia, silicon carbide or the like may be used even if they are materials having a corner part with an acute angle. Although the second blasting has been illustrated as the second impact processing, the sliding layer 3 may be attempted to be densified by a press because the second impact processing has an object of densifying the sliding layer 3.

Application Example of Sliding Member According to this Embodiment

The sliding member 1 according to this embodiment has two-layer structure having the supporting layer 2 with a function of principally receiving any load and the sliding layer 3 with a function of principally improving the slidability, and in which the sliding surface 3a can be configured to be an optional shape such as a spherical surface.

Figure 5:
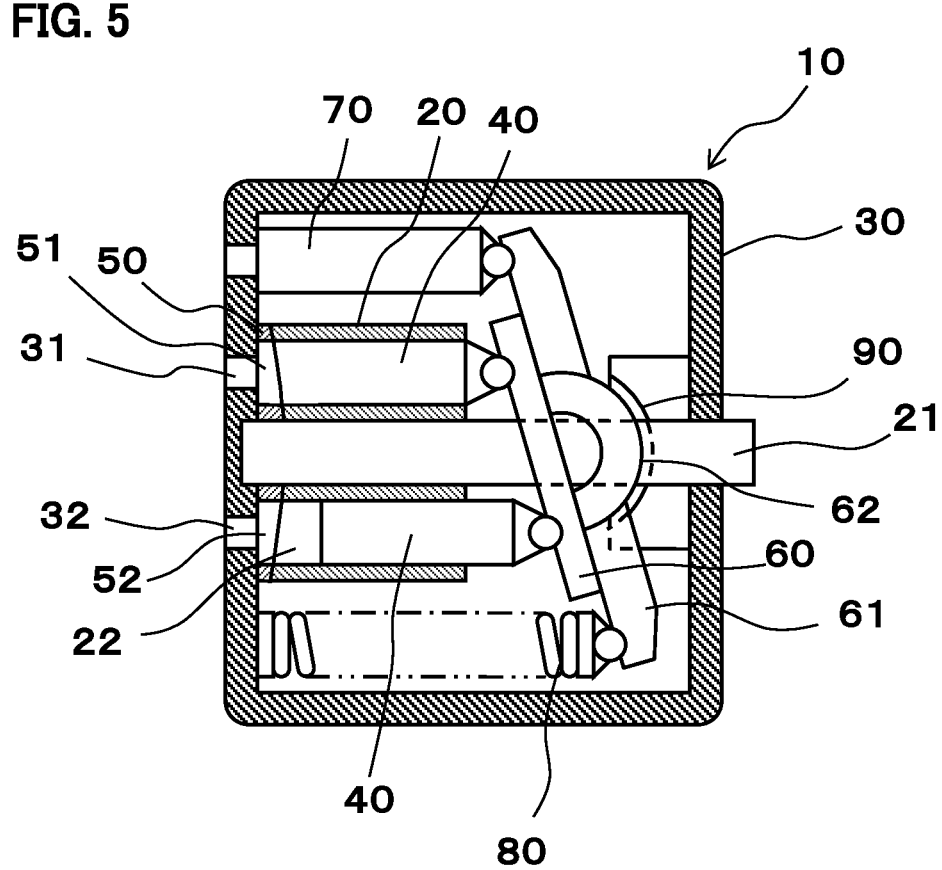
FIG. 5 is a diagram showing a configuration example of a piston pump to which a sliding member according to a subject embodiment is applied.

Therefore, it is preferable that the sliding member 1 according to this embodiment is particularly applicable to oil hydraulic equipment such as oil hydraulic pump, which has self-aligning function. FIG. 5 is a diagram showing a configuration example of a piston pump to which a sliding member according to a subject embodiment is applied and a schematically sectional side view thereof.

In the piston pump 10, a cylinder block 20 is attached to a case 30 with the input shaft 21 supporting it and driving force transmitted to the input shaft 21 forces the cylinder block 20 to rotate. In the cylinder block 20, plural cylinders 22 are formed along the rotation direction and a piston 40 is installed in each of the cylinders 22 so as to be freely drawn and inserted.

The piston pump 10 is provided with a spherical bearing 50 which rotatably supports the cylinder block 20. To the spherical bearing 50, the sliding member 1 according to this embodiment is applied and its sliding surface against the cylinder block 20 is configured to be a convex spherical surface having a predetermined radius. In the cylinder block 2, which is a body to be slid, the sliding surface against the spherical bearing 50 is configured to be concave spherical surface.

The spherical bearing 50 is provided with an inlet port 51 and an outlet port 52 which are opened along the rotating direction of the cylinder block 20 and is installed between the cylinder block 20 and the case 30 with the inlet port 51 and an inlet 31 provided in the case 30 being communicated to each other and the outlet port 52 and an outlet 32 provided in the case 30 being communicated to each other.

The spherical bearing 50 is configured so that when the cylinder block 20 rotates with it being pushed to an axis direction, the cylinder block 20 and the spherical bearing 50 are relatively slid. In the spherical bearing 50, when any force is applied to the cylinder block 20 toward a radial direction, the cylinder block 20 is inclined to the axis direction with the spherical bearing 50 and the sliding surface of the cylinder block 20 being kept to be connected with each other.

The piston pump 10 is provided with a swash plate 60 for drawing and inserting the piston 40 in relation to each of the cylinders 22 of the cylinder block 20 together with the rotation of the cylinder block 20, a yoke 61 for changing an angle of the swash plate 60, and an operating piston 70 and a return spring 80, which operate the swash plate 60 and the yoke 61.

In the piston pump 10, together with the rotation of the cylinder block 20, the cylinder 22 in which the piston is projected from the cylinder block 20 absorbs the oil but the cylinder 22 into which the piston is inserted therefrom discharges the oil. The piston pump 10 is configured so that, by changing an angle of the swash plate 60 and the yoke 61, a stroke of the piston 40 alters and a discharged amount of the oil is adjustable.

The piston pump 10 is provided with the half bearing 90, which is attached to the case 30, for swingably supporting the swash plate 60 and the yoke 61. In the half bearing 90, by swing an axis portion 62 of the yoke 61 as a member to be slid with it being pushed to a circumferential direction, the axis portion 62 and the half bearing 90 are relatively slid.

When the cylinder block 20 is configured to rotate in one direction, the piston pump 10 is configured so that the oil-absorbing side and the oil-discharging side are fixed but when the cylinder block 20 is configured to rotate in both forward and reverse directions, the piston pump 10 is configured so that the oil-absorbing side and the oil-discharging side are changeable. On the spherical gearing 50, the cylinder block 20 slides in one direction or both forward and reverse directions along the circumferential direction while heavy load is applied thereto by pushing the cylinder block 20 to the axis direction. Accordingly, the cylinder block 20 and the spherical bearing 50 slide in a circular direction with heavy load being applied to them.

Here, when any force is applied to the cylinder block 20 to the radial direction, a self-aligning function exerts the cylinder block 20 and the spherical bearing 50 because the sliding surface is a spherical surface and the cylinder block 20 is inclined in relation to the axis direction with the spherical bearing 50 and the sliding surface of the cylinder block 20 being kept to be contacted to each other.

Accordingly, even when any force is applied to the cylinder block 20 to the radial direction, it is possible to prevent any gaps from occurring between the cylinder 22 provided in the cylinder block 20 and each of the inlet port 51 and the outlet port 52, which are provided in the spherical bearing 50, so that oil leakage can be avoided.

The piston pump 10 is also configured so that the swash plate 60 and the yoke 61 are swung in both forward and reverse directions to change a discharged amount of the oil. The half bearing 90 is configured so that the axis portion 62 of the yoke 61 slides on both forward and reverse directions along the circumferential direction while heavy load is applied thereto by pushing the axis portion 62 of the yoke 61 to the circumferential direction. Accordingly, the axis portion 62 and the half bearing 90 slide to a linear direction with heavy load being applied to them.

Further, although the piston pump 10 according to this embodiment has been described as a case where the sliding member 1 according to this embodiment is applied to the spherical bearing 50, its shape is not limited thereto: The sliding member 1 according to this embodiment may be applied to the half bearing 90 or the like.

INDUSTRIAL APPLICABILITY

The sliding member according to this invention is preferably applicable to a bearing of oil hydraulic equipment to which heavy load is applied.

The invention claimed is:
1. A method of manufacturing a sliding member, the method comprising the steps of:
roughening one surface of a supporting layer which includes a first metallic material by first impact processing in which powder having a corner part with an acute angle, a particle size of 425 through 1180 µm, and hardness of 400 through 500 Hv, collides with the one surface thereof;
applying a second metallic material to the roughened one surface of the supporting layer by thermal spraying and sintering the second metallic material together with the supporting layer to form a sliding layer along one surface of the supporting layer, the second metallic material being made of copper-based material, which is different from the first metallic material;
densifying the sliding layer following the steps of forming the sliding layer, by second impact processing in which spherical powder having a particle size of 1000 through 1700 µm and hardness of 400 through 500 Hv collides with a surface of the sliding layer and applies such pressure that voids in the sliding layer are crumpled and the voids decrease; and
polishing the surface of the densified sliding layer.

\* \* \* \* \*